United States Patent [19]
Aoki et al.

[11] Patent Number: 6,121,408
[45] Date of Patent: Sep. 19, 2000

[54] POWDER COATING

[75] Inventors: Katsutoshi Aoki; Masayuki Maruta; Yukiya Sato; Hisakazu Tajima, all of Wakayama; Takehiko Tohjo, Tochigi-ken; Yasunori Inagaki, Wakayama; Shingo Tanaka, Osaka, all of Japan

[73] Assignee: Kao Corporation, Tokyo, Japan

[21] Appl. No.: 09/055,802

[22] Filed: Apr. 7, 1998

[30] Foreign Application Priority Data

Apr. 7, 1997 [JP] Japan .................................... 9-105304

[51] Int. Cl.[7] .......................... C08G 63/44; C08G 73/00; C08L 77/00; B05D 1/22; B05D 1/24

[52] U.S. Cl. .......................... 528/310; 528/170; 528/173; 528/288; 528/292; 528/296; 528/297; 528/322; 525/418; 525/420; 525/437; 525/444; 525/448; 524/600; 524/606; 427/185; 427/195; 427/459; 427/460; 427/461; 427/485

[58] Field of Search ..................................... 524/600, 606; 528/170, 173, 288, 310, 292, 322, 296, 297; 427/185, 195, 459, 460, 461, 485; 525/418, 420, 437, 444, 448

[56] References Cited

U.S. PATENT DOCUMENTS

| | | | |
|---|---|---|---|
| 4,352,924 | 10/1982 | Wooten et al. | 528/302 |
| 5,593,730 | 1/1997 | Satgurunathan et al. | 427/386 |
| 5,741,602 | 4/1998 | Hoppe et al. | 428/482 |
| 5,886,100 | 3/1999 | Aoki et al. | 525/101 |
| 5,898,043 | 4/1999 | Uemae et al. | 523/204 |

FOREIGN PATENT DOCUMENTS

| | | |
|---|---|---|
| 698645A | 2/1996 | European Pat. Off. . |
| 845507A | 6/1998 | European Pat. Off. . |
| 57-031966A | 2/1982 | Japan . |
| 59-024762A | 2/1984 | Japan . |
| 1104274 | 2/1968 | United Kingdom . |
| WO8906674A | 7/1989 | WIPO . |

OTHER PUBLICATIONS

Patent Abstracts of Japan, vol. 011, No. 085, Mar. 14, 1987 (Publication No. 61236868).

Patent Abstracts of Japan, vol. 005, No. 195, Dec. 11, 1981 (Publication No. 56118468).

Patent Abstracts of Japan, vol. 010, No. 013, Jan. 18, 1986 (Publication No. 60168771).

*Primary Examiner*—P. Hampton-Hightower
*Attorney, Agent, or Firm*—Birch, Stewart, Kolasch & Birch, LLP

[57] ABSTRACT

The powder coating for use in a coating method which includes the steps of mixing and applying two or more powder coatings to a substrate, the powder coating comprising a resin not having thermosetting properties at a temperature of 160° C. or less by itself, and being heat-cured at a temperature of 160° C. or less when used in combination with other powder coatings. The powder coating composition comprising two or more powder coatings, wherein each of the powder coatings comprises a resin not having thermosetting properties at a temperature of 160° C. or less by itself, and being heat-cured at a temperature of 160° C. or less to form a coating film when used in combination with other powder coatings.

7 Claims, No Drawings

POWDER COATING

BACKGROUND OF THE INVENTION

1. Field of the Invention

The present invention relates to a powder coating for use in a coating method comprising mixing and applying to a substrate two or more powder coatings, a powder coating composition containing the same, and a coating method therewith.

2. Discussion of the Related Art

Conventionally, powder coatings have been prepared by mixing resins, curing agents, additives, and the like, melt-kneading the mixture, followed by cooling, pulverization, and classification. In order to uniformly disperse the above additives, it has been necessary to carry out melt-kneading at a temperature of from 60° to 160° C.

However, when a curing agent which can be low-temperature cured in the above-mentioned temperature range is used, the curing of the resins initiates during melt-kneading, and therefore a powder coating cannot be prepared. In addition, when a curing agent having a high curing temperature is used in order to avoid the curing of the resins during melt-kneading, the stoving temperature is also elevated, so that a new plant investment is necessitated, and such defects as high overall running costs are increased.

On the other hand, when the kneading temperature is lowered by using a curing agent having a low curing temperature, it has been necessary to lower the fusing temperature of the resins contained in the powder coating in order that the resins can be sufficiently kneaded even at a low temperature. However, since the resin having a low fusing temperature also has a low glass transition temperature, it has poor storage stability, so that there arise defects in the quality guarantee of the resulting powder coating. In addition, although a method of mixing a curing agent with the powder coating by dry-blending has been known, the resulting powder coating is liable to have unevenness in the cured product, thereby causing the defects in lowering the coating properties. Therefore, various improvements therefor have been studied, but a powder coating with satisfactory performance has not yet been obtained (Japanese Patent Laid-Open Nos. 57-31966 and 59-24762).

An object of the present invention is to provide a powder coating for use in mixing and applying powder coatings and a powder coating composition which can be low-temperature cured and maintains sufficient storage stability.

Another object of the present invention is to provide a coating method using the powder coatings and the powder coating composition.

These and other objects of the present invention will be apparent from the following description.

SUMMARY OF THE INVENTION

One aspect of the present invention is directed to a powder coating for use in a coating method which includes the steps of mixing and applying two or more powder coatings to a substrate, the powder coating comprising a resin not having thermosetting properties at a temperature of 160° C. or less by itself, and being heat-cured at a temperature of 160° C. or less when used in combination with other powder coatings.

Another aspect of the present invention is directed to a powder coating composition comprising two or more powder coatings, wherein each of the powder coatings comprises a resin not having thermosetting properties at a temperature of 160° C. or less by itself, and being heat-cured at a temperature of 160° C. or less to form a coating film when used in combination with other powder coatings.

Another aspect of the present invention is directed to a coating method comprising (a) mixing two or more powder coatings described above to form a mixture; and (b) applying the mixture to a substrate; and (c) heating the mixture at a temperature of 160° C. or less to heat cure the powder coating mixture.

Yet another aspect of the present invention is directed to a coating method comprising (a) applying to a substrate the powder coating composition described above; and (b) heating the composition at a temperature of 160° C. or less to heat cure the powder coating composition.

DETAILED DESCRIPTION OF THE INVENTION

The powder coating of the present invention is concerned with a powder coating for use in a coating method which includes the steps of mixing and applying two or more powder coatings to a substrate, the powder coating comprising a resin not having thermosetting properties at a temperature of 160° C. or less by itself, and being heat-cured at a temperature of 160° C. or less when used in combination with other powder coatings.

The resin usable in the powder coating of the present invention may be any conventionally known resin without limitation, wherein the fusing temperature of the resin is 160° C. or less, preferably 90° to 140° C., and the fusing temperature must be adjusted to a temperature not higher than the curing temperature of the mixed powder coatings.

In the present invention, the fusing temperature refers to a softening temperature, i.e. a temperature at which the resin liquefies. The fusing temperature of the resin can be adjusted in a manner such as modification of the chemical structure or modification of the molecular weight distribution of the resin.

In addition, it is desired that the glass transition temperature of the resin usable in the present invention is 40° C. or more, preferably 50° C. or more from the aspect of storage stability, and that the glass transition temperature is 90° C. or less, preferably 80° C. or less from the aspect of the fusing temperature of the powder coating.

In the present invention, in the case where two or more powder coatings are mixed and applied by suitably selecting a combination of resins respectively used for two or more powder coatings, each of which does not have thermosetting properties alone at a temperature of 160° C. or less, and preparing the powder coating according to the following embodiments, the powder coatings are fused and mixed to be heat-cured at a temperature of 160° C. or less, to form a coating film.

Incidentally, the phrase "does not have thermosetting properties" refers to the fact that an exothermic peak corresponding to thermosetting cannot be detected when measured by using a differential scanning calorimeter ("DSC210," manufactured by Seiko Instruments), at a heating rate of 10° C./minute. In addition, the term "resin" used in the present specification refers to a resin which is a polymeric substance having a number-molecular weight of 500 or more, preferably 1000 or more, and having an ability to form a film by heat-fusing.

There are two embodiments in the present invention described below:

(1) An embodiment where each of the resins contained in the respective powder coatings is fused and mixed with each other to cause a curing reaction by the resins themselves at a temperature of 160° C. or less; and (2) An embodiment where no curing reactions take place between resins themselves at a temperature of 160° C. or less, but when adding a curing agent to the resin, each of powder coatings is cured with other powder coatings used in combination at a temperature of 160° C. or less.

Each of the embodiments will be detailed below.

(1) Embodiment Where a Curing Reaction Takes Place Between the Resins Contained in the Respective Powder Coatings In this embodiment, when the powder coatings usable in this embodiment are denoted by Powder Coating A and Powder Coating B, the resin usable for Powder Coating A and the resin usable for Powder Coating B have to be selected such that the resins do not cause a curing reaction when used alone at a temperature of 160° C. or less, but a curing reaction takes place when the resins are fused and mixed with each other at a temperature of 160° C. or less. Examples of suitable combinations of the functional groups capable of carrying out a curing reaction include combinations of one member selected from a carboxyl group, an acid anhydride group, an amino group, a phenolic hydroxyl group, with one member selected from a glycidyl group, an epoxy group, an isocyanate group, and a group having one or more unsaturated bonds.

Accordingly, the combinations of the resin usable in Powder Coating A and the resin usable in Powder Coating B include, for instance, combinations of one or more resins selected from the group consisting of resins having one or more carboxyl groups, resins having one or more amino groups, resins having one or more phenolic hydroxyl groups, and anhydride resins with one or more resins selected from the group consisting of resins having one or more epoxy groups, resins having one or more glycidyl groups, and resins having one or more unsaturated bonds.

Here, examples of the resins having one or more carboxyl groups include polyester resins, polyester-polyamide resins, (meth)acrylate-based acrylic resins, and the like; examples of the resins having one or more amino groups include polyamide resins, polyester-polyamide resins, and the like; examples of the phenolic hydroxyl groups include novolak resins, and the like; examples of the anhydride resins include butadiene-maleic anhydride copolymers, and the like; examples of the resins having one or more epoxy groups include epoxy resins, and the like; examples of the resins having one or more glycidyl groups include glycidyl methacrylate-based acrylic resins, and the like; and resins having one or more unsaturated bonds include unsaturated polyester resins. In this case, it is more desired that each of the polyester resins, polyester-polyamide resins, polyamide resins, and anhydride resins has an amino group, a carboxyl group, or an acid anhydride group at its terminus. The above-exemplified resins may be prepared by any conventional methods without particular limitation.

In addition, in this embodiment, in a case where the resins are used in the above combinations, curing agents may be optionally, though not essentially, used. In a case where a curing agent is used, the usable curing agents may be any of various conventionally known curing agents without particular limitation, provided that a combination of a resin and a curing agent mixed in the same powder coating has to be suitably selected such that the powder coating does not have thermosetting properties alone at a temperature of 160° C. or less.

Specifically, the resins and the curing agents in the powder coating have to be selected such that combinations of the resins and the curing agents in the powder coatings are:

Powder Coating $A$=Resin $A$+Curing Agent $B'$;

and

Powder Coating $B$=Resin $B$+Curing Agent $A'$, wherein Resins A, B denote resins in Powder Coatings A, B, respectively; Curing Agent A' denotes a curing agent reactive with Resin A but unreactive with Resin B; and Curing Agent B' denotes a curing agent reactive with Resin B but unreactive with Resin A.

In this embodiment, a curing agent reactive with a resin contained in one powder coating is contained in the other powder coating, wherein the powder coating which does not have thermosetting properties alone at a temperature of 160° C. or less can be prepared.

In addition, in another embodiment where a curing agent is used, a curing agent may be contained in only one of the powder coatings.

Powder Coating $A$=Resin $A$;

and

Powder Coating $B$=Resin $B$+Curing Agent $A'$, wherein Resins A, B and Curing Agent A' are as defined above.

In this embodiment, the curing reaction proceeds with the respective reactions between Resin A and Resin B and Resin A and Curing Agent A'. Incidentally, curing agents can be suitably selected from known blocked isocyanate-based curing agents, epoxy-based curing agents, alkoxysilane-based curing agents, polyaziridine-based curing agents, oxazoline-based curing agents, and the like depending upon the corresponding functional groups of the reactive resin.

In the present invention, examples of combinations of the resins and the curing agents which are reactive to cause a curing reaction, each listed below as either Resin A [Curing Agent A'] or Resin B [Curing Agent B'], include an organopolysiloxane [an aminoxysilane compound], an organopolysiloxane [an alkoxysilane compound], a silicone polymer [a tin compound], a polysulfide polymer [lead dioxide], a urethane resin [an acrylic oligomer], a urethane resin [a polyol compound], a urethane prepolymer [a polyol compound], a polyester resin [a polyepoxy compound], a polyester resin [a poly(acid anhydride) compound], a polyester resin [a polyamine compound], a polyester resin [a modified melamine compound], a polyester resin having one or more terminal hydroxyl groups [an alkoxy compound], a polyester resin having one or more carboxyl groups [triglycidyl isocyanurate (hereinafter simply referred to as "TGIC")], a polyester resin having one or more terminal amino groups [TGIC], a polyester resin having one or more terminal amino groups [a modified melamine compound], a polyester resin having one or more phenolic hydroxyl groups [TGIC], an unsaturated polyester resin having one or more terminal hydroxyl groups other than phenolic hydroxyl groups [a melamine compound], an unsaturated polyester resin having one or more terminal hydroxyl groups other than phenolic hydroxyl groups [2,4,6-triaminopyridine], an epoxy resin [a polyamine compound], an epoxy resin [a poly(acid anhydride) compound], an epoxy resin [an aromatic diamine compound], an epoxy resin [dihydrazide adipate], an epoxy resin [2,4,6-triaminopyridine], an epoxy resin [a polycarboxylic acid compound], an epoxy resin and an acrylic resin having one or more glycidyl groups [2,4,6-triaminopyridine], an acrylic resin having one or more amino groups [TGIC], a polyamide resin [a polycarboxylic acid compound], a polyamide resin having one or more terminal amino groups [TGIC], a polyester-polyamide resin [a polycarboxylic acid compound], a polyester-polyamide resin [TGIC], a novolak resin [a polycarboxylic acid compound], an alkoxy resin [a polyol compound], and the like.

Accordingly, concrete examples of combinations of the resins and the curing agents in Powder Coating A and Powder Coating B include the following without being limited thereto:

Combination 1
Powder Coating A
  Resin A: Polyamide resin having one or more terminal amino groups;
Powder Coating B
  Resin B: Epoxy resin or acrylic resin having one or more glycidyl groups; and
  Curing
  Agent A': TGIC.
Combination 2
Powder Coating A
  Resin A: Polyester-polyamide resin having one or more terminal amino groups;
Powder Coating B
  Resin B: Epoxy resin or acrylic resin having one or more glycidyl groups; and
  Curing
  Agent A': TGIC.
Combination 3
Powder Coating A
  Resin A: Epoxy resin or acrylic resin having one or more glycidyl groups;
Powder Coating B
  Resin B: Polyamide resin having one or more terminal amino groups; and
  Curing
  Agent A': 2,4,6-Triaminopyridine.
Combination 4
Powder Coating A
  Resin A: Epoxy resin or acrylic resin having one or more glycidyl groups;
Powder Coating B
  Resin B: Polyester-polyamide resin having one or more terminal amino groups; and
  Curing
  Agent A': 2,4,6-Triaminopyridine.
Combination 5
Powder Coating A
  Resin A: Epoxy resin or acrylic resin having one or more glycidyl groups; and
  Curing
  Agent B': TGIC.
Powder Coating B
  Resin B: Polyamide resin having one or more terminal amino groups; and
  Curing
  Agent A': 2,4,6-Triaminopyridine.
Combination 6
Powder Coating A
  Resin A: Epoxy resin or acrylic resin having one or more glycidyl groups; and
  Curing
  Agent B': TGIC.
Powder Coating B
  Resin B: Polyester-polyamide resin having one or more terminal amino groups; and
  Curing
  Agent A': 2,4,6-Triaminopyridine.
Combination 7
Powder Coating A
  Resin A: Acrylic resin having one or more amino groups;
Powder Coating B
  Resin B: Epoxy resin or acrylic resin having one or more glycidyl groups; and
  Curing
  Agent A': TGIC.
Combination 8
Powder Coating A
  Resin A: Polyester resin having one or more terminal carboxyl groups;
Powder Coating B
  Resin B: Epoxy resin or acrylic resin having one or more glycidyl groups; and
  Curing
  Agent A': TGIC.

In this embodiment, although the proportion (weight ratio) of Resin A to Resin B depends upon the amount of functional groups being present in the resins, it is desired that the weight ratio of Resin A to Resin B is from 10/90 to 90/10, preferably from 25/75 to 75/25, and that the ratio of functional groups is in the range of 0.8 to 1.2 in terms of the equivalency ratio of the functional groups. Also, the amount of the usable curing agents may be of the level required for a conventional thermosetting reaction. It is desired that the amount of the curing agent is adjusted such that the ratio of the sum of the functional groups in the curing agent and the functional groups in the resin of the same powder coating similarly contributing to the curing reaction to that in the reactive resin is from 0.8 to 1.2 in terms of the equivalency ratio of the functional groups contained therein.

(2) Embodiment Where No Curing Reactions Take Place Between the Resins Themselves at a Temperature of 160° C. or Less When the powder coatings usable in this embodiment are respectively denoted by Powder Coating C and Powder Coating D, it is essential that the resin usable in Powder Coating C and the resin usable in Powder Coating D are selected such that no curing reactions take place even when these resinous components are fused and mixed at a temperature of 160° C. or less.

Specifically, in this embodiment, the resins and the curing agents in the powder coating have to be selected such that combinations of the resins and the curing agents in the powder coatings are:

Powder Coating $C$=Resin $C$+Curing Agent $D'$;

and

Powder Coating $D$=Resin $D$+Curing Agent $C'$, wherein Resins C, D denote resins in Powder Coatings C, D respectively, provided that no curing reactions take place between Resin C and Resin D at a temperature of 160° C. or less; Curing Agent C' denotes a curing agent reactive with Resin C but unreactive with Resin D; and Curing Agent D' denotes a curing agent reactive with Resin D but unreactive with Resin C.

In other words, in this embodiment, a curing agent contained in one powder coating is added for a desired curing reaction with the resin contained in the other powder coating, whereby a powder coating which does not have thermosetting properties alone can be prepared.

Combinations of resins and curing agents which react with each other to cause a curing reaction are not particularly limited as long as the above-described relationships are satisfactorily met.

Therefore, concrete examples of combinations of resins and curing agents in Powder Coatings C and D include the following, without being limited thereto.

Combination 1
Powder Coating C
    Resin C: Unsaturated polyester resin having one or more terminal hydroxyl groups other than phenolic hydroxyl groups;
    Curing
    Agent D': TGIC
Powder Coating D
    Resin D: Polyester resin having one or more phenolic hydroxyl groups; and
    Curing
    Agent C': Melamine compound.

Combination 2
Powder Coating C
    Resin C: Unsaturated polyester resin having one or more terminal hydroxyl groups other than phenolic hydroxyl groups;
    Curing
    Agent D': TGIC
Powder Coating D
    Resin D: Novolak resin; and
    Curing
    Agent C': 2,4,6-Triaminopyridine.

Combination 3
Powder Coating C
    Resin C: Urethane prepolymer;
    Agent D': TGIC;
Powder Coating D
    Resin D: Polyester-polyamide resin having one or more terminal amino groups; and
    Agent C': Polyol compound.

Combination 4
Powder Coating C
    Resin C: Polyester resin having one or more terminal hydroxyl groups;
    Curing
    Agent D': TGIC;
Powder Coating D
    Resin D: Polyester-polyamide resin having one or more terminal amino groups; and
    Curing
    Agent C': Alkoxy compound.

Combination 5
Powder Coating C
    Resin C: Epoxy resin or acrylic resin having one or more glycidyl groups;
    Curing
    Agent D': Alkoxy compound;
Powder Coating D
    Resin D: Polyester resin having one or more terminal hydroxyl groups other than phenolic hydroxyl groups; and
    Curing
    Agent C': Diamine compound.

Combination 6
Powder Coating C
    Resin C: Alkoxy resin;
    Curing
    Agent D': TGIC;
Powder Coating D
    Resin D: Polyester-polyamide resin having one or more terminal amino groups; and
    Curing
    Agent C': Polyol compound.

Here, it desired that the proportion (weight ratio) of Resin C to Resin D is from 10/90 to 90/10, and that the amount of the usable curing agents is adjusted such that the ratio of the functional groups in the curing agents to that in the reactive resin is from 0.8 to 1.2 in terms of the equivalency ratio of the functional groups contained therein.

In the powder coating of the present invention, colorants, various additives, and the like may be further added thereto as occasion demands.

The colorants usable in the present invention may be any known ones without particular limitation, which may be suitably selected depending upon the desired tone. Concrete examples thereof include, for instance, titanium oxide, carmine 6B, carbon blacks, copper phthalocyanine, acetoacetic acid arylamide-based monoazo yellow pigments, dis-azo yellows, pigment reds, and the like. It is desired that the amount thereof is from about 5 to about 60 parts by weight, based on 100 parts by weight of the resin. Incidentally, when a colorant is not added in the preparation of the powder coating, the resulting powder coating has a transparent color.

Various additives usable in the present invention may be any conventionally known ones usable in the composition of powder coatings without particular limitation. Examples thereof include leveling agents, such as acrylate polymers, crosslinking accelerators, such as various catalysts and organotin compounds, and pinhole preventives, such as benzoin. Each of the additives may be preferably added in an amount of from about 0.1 to about 5 parts by weight, based on 100 parts by weight of the resins.

The powder coating of the present invention may be prepared firstly by melt-kneading each of the above components using an extruder. After cooling the resulting kneaded mixture, it is subjected to physical pulverization using pulverizing devices, such as hammer mills and jet mills, and then the pulverized product is classified using classifiers, such as air classifiers and micron-classifiers, to give powder coatings of desired average particle sizes. Here, flowability controlling agents, such as silica, alumina, titania, or zirconia may be further added to the surfaces of the powder coating.

It is desired that the average particle size of the powder coating of the present invention is 1 $\mu$m or more, preferably 5 $\mu$m or more, still more preferably 10 $\mu$m or more, from the viewpoint of inhibiting agglomeration of the powder coating particles and uniformly mixing the two or more powder coatings. Also, it is desired that the average particle size is 50 $\mu$m or less, preferably 30 $\mu$m or less, from the viewpoint of inhibiting excessive thickening of the resulting coating film.

It is desired that the curing temperature at mixing and fusing two or more powder coatings of the present invention is 50° C. or more, preferably 60° C. or more, from the viewpoint of storage stability of the powder coating, and that the curing temperature is 160° C. or less, preferably from 90° to 150° C., from the viewpoint of running costs during the stoving process and plant investment. Here, the curing temperature is a temperature corresponding to the maximum value of the exothermic peak measured by using a differential scanning calorimeter, at a heating rate of 10° C./min.

The powder coating of the present invention described above has such properties that each of the powder coatings does not have thermosetting properties alone at a temperature of 160° C. or less, and is heat-cured at a temperature of 160° C. or less when used in combination with other powder coatings. In other words, during the stoving and curing process, after each of the powder coatings is fused and sufficiently uniformly mixed, and the resulting mixture is heat-cured.

In conventionally known powder coatings, since a curing agent capable of low-temperature curing is added, thermosetting takes place by itself at a temperature of 160° C. or less during kneading, so that much attention to temperature control has been necessary during the preparation of individual coating powders. Moreover, although a method of adding a curing agent immediately before its application to a substrate is known, there have been defects in that the reaction proceeds locally, so that unevenness in the cured product is likely to be caused, thereby making the properties of the resulting coating film poor.

By contrast, in the embodiment of the present invention where curing agents are not essential, the resins used in each of the powder coatings do not have thermosetting properties alone at a temperature of 160° C. or less, and when mixing and applying two or more powder coatings to a substrate, the resins usable in each of the powder coatings are fused with each other upon stoving and uniformly mixed, in which one resin acts as a curing agent for the other resin, thereby causing a curing reaction at a temperature of 160° C. or less for the first time. Therefore, one resin has to be selected such that one resin has functional groups acting as a curing agent for the other resin. As for the combinations of the resins, the above-mentioned combinations may be applicable.

On the other hand, in the embodiment of the present invention where curing agents are used, in contrast with the conventional powder coating wherein the resin and the curing agent are reactive to each other are contained in the same powder coating, a resin and a curing agent contained in a single powder coating are selected such that they are unreactive with each other. Therefore, no curing reactions take place in a single powder coating at a temperature of 160° C. or less, and by fusing and mixing two or more powder coatings during stoving, the curing reaction is caused by the action of a curing agent contained in a counterpart powder coating.

Incidentally, in the present specification, the term "mixing and applying" means that the two or more powder coatings are mixed and applied to a substrate. By mixing and applying to a substrate, two or more powder coatings are fused with each other by heat, so that the resulting mixture is heat-cured to form a coating film. The methods for mixing powder coatings may be carried out by any of conventionally known methods, including such dry-blending methods using high-speed agitators, such as a Henschel mixer and a Super Mixer. The term "applying" used in the present specification refers to a series of treatments for forming a coating film comprising applying the powder coatings to a substrate by various methods described below, and then stoving at a temperature of 160° C. or less. Also, the "applying" used for the powder coating composition in the present invention has the same meaning as above.

Further, the present invention provides a powder coating composition in which two or more powder coatings are previously mixed. In other words, the powder coating composition of the present invention comprises two or more powder coatings, wherein each of the powder coatings comprises a resin not having thermosetting properties at a temperature of 160° C. or less by itself, and being heat-cured at a temperature of 160° C. or less to form a coating film when used in combination with other powder coatings. Therefore, since the powder coating composition of the present invention contains two or more powder coatings having the above-mentioned properties, the powder coatings are heat-cured in the state that the powder coating composition is fused and mixed during the stoving and curing process.

It is desired that the powder coating composition of the present invention comprises a powder coating containing one or more resins selected from the group consisting of resins having one or more carboxyl groups, resins having one or more amino groups, resins having one or more phenolic hydroxyl groups, and anhydride resins; and other powder coatings containing one or more resins selected from the group consisting of resins having one or more epoxy groups, resins having one or more glycidyl groups, and resins having one or more unsaturated bonds. In this case, it is more desired that each of polyester resins, polyester-polyamide resins, polyamide resins, and anhydride resins has an amino group, a carboxyl group, or an acid anhydride group at its terminus. In addition, when the resin is used together with a curing agent, the above-listed combinations are similarly applicable.

The methods for preparing powder coating compositions comprising mixing two or more powder coatings may be any of conventionally known methods, including such dry-blending methods using high-speed agitators, such as a Henschel mixer and a Super Mixer.

In the present invention, there are the following embodiments 1) to 3) for the combinations of powder coatings or the powder coating compositions:

1) Two or more powder coatings prepared by mixing one transparent powder coating, and other colored powder coatings.
2) Two or more powder coatings prepared by mixing powder coatings having the same color.
3) Two or more powder coatings prepared by mixing powder coatings, each having a different color.

Among the above embodiments 1) to 3), preference is given to embodiment 2) where the present invention can be more effectively pursued.

The powder coating of the present invention can be used for (i) a coating method comprising (a) mixing two or more powder coatings described above to form a mixture; and (b) applying the mixture to a substrate; and (c) heating the mixture at a temperature of 160° C. or less to heat cure the powder coating mixture, or it can be used for (ii) a coating method comprising (a) applying to a substrate the powder coating composition described above; and (b) heating the composition at a temperature of 160° C. or less to heat cure the powder coating composition. In the case where the two or more powder coatings are mixed and applied, the two or more powder coatings usable in the combination may be previously mixed and then applied, or they may be applied using an electron gun, while mixing the two or more powder coatings. The means of coating include, for instance, coating methods using electrostatic sprayers, fluidized bed coating methods, plastic flame spraying methods, and the like.

In the coating film or coated substrate prepared from the powder coating of the present invention or from the powder coating composition of the present invention, a uniform coating film can be formed by fusing and mixing each of the powder coatings, and subsequently heat-curing the resulting mixture. Therefore, the resulting coating film has excellent coating strength, gloss, and weathering resistance.

Also, the powder coating and the powder coating composition of the present invention can serve to raise the glass transition temperature of each of the powder coatings, thereby making it possible to maintain sufficient storage stability.

EXAMPLES

The softening point, the glass transition temperature, the amine value, the oxirane value, and the curing temperature shown in the following examples were measured as follows.
Softening Point
Measured by a method according to ASTM E28-67.
Glass Transition Temperature
The "glass transition temperature" refers to the temperature of an intersection of the extension of the baseline of not more than the glass transition temperature and the tangential line showing the maximum inclination between the kickoff of the peak and the top of curves as determined with a sample using a differential scanning calorimeter ("DSC Model 210," manufactured by Seiko Instruments, Inc.), at a heating rate of 10° C./min.
Amine Value and Oxirane Value
Measured by a method according to ASTM D2073-66.
Curing Temperature
Temperature corresponding to the maximum value of the exothermic peak measured using 3 mg of powder coating sample, and by using the differential scanning calorimeter ("DSC Model 210, " manufactured by Seiko Instruments, Inc.), at a heating rate of 10° C./min.
Average Particle Size
Measured using a Coulter-Multisizer (manufactured by Coulter K.K.).

Resin Preparation Example 1

A three-liter four-necked flask equipped with a thermometer, a stainless stirring rod, a reflux condenser, and a nitrogen inlet tube was charged with 630 g (6.0 mol) of neopentyl glycol, 750 g (4.5 mol) of terephthalic acid, and 660 g (4.5 mol) of adipic acid, and the ingredients were heated to 230° C. and reacted. Thereafter, 409 g (3.0 mol) of m-xylylenediamine was added to the above mixture to form a polyamide. The reaction was terminated when the softening point reached 100° C., to give a polyester-polyamide resin.

The resulting resin is referred to as "Resin A." Resin A had an amine value of 57.8 mg KOH/g, a glass transition temperature of 54° C., and a curing temperature of 160° C. or more.

Resin Preparation Example 2

The same procedures as in Resin Preparation Example 1 were carried out except that 700 g (2.0 mol) of propylene oxide adduct of bisphenol A and 440 g (3.0 mol) of adipic acid were used and that the amount of m-xylylenediamine was changed to 270 g (2.0 mol), to form a polyamide. The reaction was terminated when the softening point reached 110° C., to give a polyester-polyamide resin.

The resulting resin is referred to as "Resin B." Resin B had an amine value of 62.6 mg KOH/g, a glass transition temperature of 59° C., and a curing temperature of 160° C. or more.

Resin Preparation Example 3

A ten-liter four-necked flask similarly equipped as in Resin Preparation Example 1 was charged with 3 L of toluene, and the flask was heated to 100° C. Thereafter, a dropping funnel was charged with 142 g (1.0 mol) of glycidyl acrylate, 900 g (9.0 mol) of methyl methacrylate, and 20 g (0.2 mol) of dicumyl peroxide, and the resulting mixture was added dropwise to the flask over two hours to react the components. After termination of dropwise addition, the reaction was carried out for 3 hours at 100° C., and the resulting mixture was heated to 160° C., and evaporated under reduced pressure at 100 Torr to remove the residual toluene, to give an acrylic resin having glycidyl groups.

The resulting resin is referred to as "Resin C." Resin C had an oxirane value of 65 mg KOH/g, a glass transition temperature of 60° C., and a curing temperature of 160° C. or more.

Resin Preparation Example 4

The same procedures as in Resin Preparation Example 3 were carried out using 3 L of toluene, 180.3 g (2.5 mol) of acrylic acid, 1302.5 g (12.5 mol) of methyl methacrylate, 320.5 g (2.5 mol) of butyl acrylate, and 20 g (0.2 mol) of dicumyl peroxide, to give a resin having carboxyl groups.

The resulting resin is referred to as "Resin D." Resin D had an acid value of 65.0 mg KOH/g, a glass transition temperature of 48° C., and a curing temperature of 160° C. or more.

Resin Preparation Example 5

A two-liter four-necked glass flask similarly equipped as in Resin Preparation Example 1 was charged with 150 g of ethylene glycol, 64 g of neopentyl glycol, 174 g of fumaric acid, 114 g of terephthalic acid, 2 g of dibutyltin oxide, and 1.5 g of hydroquinone, to react the components at 200° C. under nitrogen gas stream with stirring. The reaction was terminated when the softening point reached 105° C., to give a resin having unsaturated bonds.

The resulting resin is referred to as "Resin E." Resin E had an acid value of 50.0 mg KOH/g, a glass transition temperature of 60° C., and a curing temperature of 160° C. or more.

Preparation Example for Powder Coatings 1 Through 13

The components shown in Table 1 and Table 2 were dry-blended using a Henschel Mixer, and the resulting mixture was then kneaded using a Buss Ko-kneader (manufactured by Buss (Japan) Ltd.) at a temperature of from 80° to 130° C. The kneaded mixture was cooled, and the cooled product was then pulverized using a pulverizer "PJM" (manufactured by Nippon Pneumatic MFG, Co., Ltd.), to give a powder having an average particle size of 25 μm. To 100 parts by weight of the resulting powder, 0.3 parts by weight of hydrophobic silica "R972" (manufactured by Nippon Aerosil Co., Ltd.) were added, and the mixture was uniformly blended using a Henschel mixer, to give Powder Coatings 1 through 13.

TABLE 1

| | Powder Coatings | | | | | |
|---|---|---|---|---|---|---|
| | 1 | 2 | 3 | 4 | 5 | 6 |
| Resin A | 100 | | | 60 | | 90 |
| Resin B | | | | 40 | | |
| Resin C | | | 40 | | | |
| Epoxy Resin[1] | | 100 | 60 | | 90 | |
| Leveling Agent[2] | 1 | 1 | 1 | 1 | 1 | 1 |
| Titanium Oxide[3] | 40 | 40 | 40 | 40 | 40 | 40 |
| Disazo Yellow[4] | 10 | 10 | 10 | 10 | 10 | 10 |
| TGIC | | | | | 10 | |
| 2,4,6-Triaminopyridine | | | | | | 10 |

Remarks:
[1]"EPOMIK ™ R304" manufactured by Mitsui Chemical, Inc.
[2]"MODAFLOW POWDER 2000" manufactured by Nihon Monsanto.
[3]"TYPAQUE CR-90" manufactured by Ishihara Sangyo Kaisha, Ltd.
[4]"PIGMENT YELLOW ECY-210" manufactured by Dainichi Seika K.K.

TABLE 2

| | Powder Coatings | | | | | | |
|---|---|---|---|---|---|---|---|
| | 7 | 8 | 9 | 10 | 11 | 12 | 13 |
| Polyester Resin[1] | 100 | | | | | | |
| Resin D | | | 100 | | | | |
| Novolak Resin[2] | | | | 100 | | | |
| Isobutylene-Maleic anhydride Copolymer[3] | | | | | 100 | | |
| Epoxy Resin[4] | | 100 | | | | | |
| Resin C | | | | | | 100 | |
| Resin E | | | | | | | 100 |
| Leveling Agent[5] | 1 | 1 | 1 | 1 | 1 | 1 | 1 |
| Triphenylphosphine | 1 | | 1 | | | | |
| Titanium Oxide[6] | 40 | 40 | 40 | 40 | 40 | 40 | 40 |
| Disazo Yellow[7] | 10 | 10 | 10 | 10 | 10 | 10 | 10 |

Remarks:
[1]"CC341" manufactured by Daicel UCB.
[2]"NIKANOL GP" manufactured by Mitsuibishi Gas Chemicals.
[3]"ISOBAN 600" manufactured by Kuraray Co., Ltd.
[4]"EPICOAT 1002" manufactured by Yuka Shell Epoxy K.K.
[5]"MODAFLOW POWDER 2000" manufactured by Nihon Monsanto.
[6]"TYPAQUE CR-90" manufactured by Ishihara Sangyo Kaisha, Ltd.
[7]"PIGMENT YELLOW ECY-210" manufactured by Dainichi Seika K.K.

Examples 1 through 11

Fifty parts by weight each of Powder Coatings in combination shown in Table 3 were added and blended using a Henschel mixer.

Next, the resulting powder coating was applied to a degreased steel substrate using an electrostatic sprayer, and the coated steel substrate was stoved at 140° C. for 10 minutes to form a coating film.

The properties of the resulting powder coatings and the coating films were evaluated by the following methods. Each of the results is shown in Table 3.

(1) Pencil Hardness of Coating Film

Experimented by a method according to ASTM 3363-74, indicating the hardest pencil hardness in which no cutting marks are shown in the coating film.

In the evaluation standards, the softest rank is 6B, and subsequent ranks in a sequential order of 5B, 4B, 3B, 2B, B, F, H, 2H, 3H, 4H, 5H, and the hardest rank, 6H.

(2) Impact Resistance of Coating Film

Experimented by a method according to JIS K 5460 6.13, measuring the minimum height at which no cracks or peeling take place in the coating film.

(3) Erichsen Indentation Test of Coating Film

Tested by a method according to JIS B 7777, and evaluated by the following ranks:

○: No cracks or peeling take place at indentation of 7 mm in the coating film; and ×: Some cracks or peeling take place at indentation of not more than 7 mm.

(4) Accelerated Weathering of Coating Film

Experimented by exposing a steel plate to which a powder coating is applied in a weather tester having a fluorescent tube at 313 nm and measured by a method according to JIS K 5400 9.8. Here, the coating films having substantially no changes in gloss are ranked "○".

(5) Gloss of Coating Film

Measured by using a glossmeter "GM-60" (manufactured by Minolta Co., Ltd.) by a method according to ASTM 3363-74.

TABLE 3

| | Example Nos. | | | | | | | | | | |
|---|---|---|---|---|---|---|---|---|---|---|---|
| | 1 | 2 | 3 | 4 | 5 | 6 | 7 | 8 | 9 | 10 | 11 |
| Combination | Powder Coating 1 / Powder Coating 2 | Powder Coating 1 / Powder Coating 3 | Powder Coating 1 / Powder Coating 5 | Powder Coating 3 / Powder Coating 4 | Powder Coating 4 / Powder Coating 5 | Powder Coating 3 / Powder Coating 6 | Powder Coating 5 / Powder Coating 6 | Powder Coating 7 / Powder Coating 8 | Powder Coating 9 / Powder Coating 10 | Powder Coating 11 / Powder Coating 8 | Powder Coating 12 / Powder Coating 13 |
| Curing Temp. (° C.) | 120 | 130 | 110 | 120 | 110 | 110 | 110 | 140 | 145 | 140 | 130 |
| Pensil Hardness of Coating Film | 2H | H | H | H | H | H | H | H | 2H | 2H | 2H |
| Impact Resistance of Coating Film (cm) | 50 | 45 | 50 | 50 | 50 | 50 | 50 | 50 | 55 | 50 | 50 |
| Erichsen Indentation Test of Coating Film | ○ | ○ | ○ | ○ | ○ | ○ | ○ | ○ | ○ | ○ | ○ |
| Accelerating Weathering of Coating Film | ○ | ○ | ○ | ○ | ○ | ○ | ○ | ○ | ○ | ○ | ○ |
| Gloss of | 95 | 98 | 94 | 96 | 98 | 97 | 96 | 98 | 95 | 90 | 92 |

TABLE 3-continued

| | Example Nos. | | | | | | | | | | |
|---|---|---|---|---|---|---|---|---|---|---|---|
| | 1 | 2 | 3 | 4 | 5 | 6 | 7 | 8 | 9 | 10 | 11 |
| | Powder Coating 1 | Powder Coating 1 | Powder Coating 1 | Powder Coating 3 | Powder Coating 4 | Powder Coating 3 | Powder Coating 5 | Powder Coating 7 | Powder Coating 9 | Powder Coating 11 | Powder Coating 12 |
| | Powder Coating 2 | Powder Coating 3 | Powder Coating 5 | Powder Coating 4 | Powder Coating 5 | Powder Coating 6 | Powder Coating 6 | Powder Coating 8 | Powder Coating 10 | Powder Coating 8 | Powder Coating 13 |
| Combination | 2 | 3 | 5 | 4 | 5 | 6 | 6 | 8 | 10 | 8 | 13 |
| Coating Film (%) | | | | | | | | | | | |

COMPARATIVE EXAMPLE

One-hundred parts by weight of Powder Coating 7 and 10 parts by weight of TGIC ("ARALDITE PT810," manufactured by Ciba Geigy AG) were blended using a Henschel mixer. The resulting mixture was applied to form a coating film by the same manner as in Examples.

The properties of the resulting powder coating and coating film were evaluated in the same manner as in Examples 1 through 11. The resulting powder coating had a curing temperature of 140° C., and the resulting coating film had a pencil hardness of HB, an impact resistance of 40 cm, an evaluation result of Erichsen indentation test of 'x', owing to cracks formed in the coating film at 5 mm, and a gloss of 35%.

As is clear from the above results, the curing temperatures of the powder coatings prepared by Examples are all as low as 110° to 130° C., and the resulting coating films have excellent pencil hardness, gloss, and weather resistance.

According to the present invention, there can be provided a powder coating for use in mixing and applying powder coatings which can be low-temperature cured and maintains sufficient storage stability, a powder coating composition, and coating methods therewith.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A powder coating composition for use in a coating method which includes the steps of mixing and applying two or more powder coatings to a substrate, comprising a single powder coating, said single powder coating comprising a resin not having thermosetting properties at a temperature of 160° C. or less by itself, and being heat-cured at a temperature of 160° C. or less when used in combination with other powder coatings.

2. The powder coating composition according to claim 1, wherein said single powder coating is used in combination with other powder coatings containing one or more resins selected from the group consisting of resins having one or more epoxy groups, resins having one or more glycidyl groups, and resins having one or more unsaturated bonds, and said powder coating contains one or more resins selected from the group consisting of resins having one or more carboxyl groups, resins having one or more amino groups, resins having one or more phenolic hydroxyl groups, and anhydride resins.

3. The powder coating composition according to claim 1, wherein said single powder coating is used in combination with other powder coatings containing one or more resins selected from the group consisting of resins having one or more carboxyl groups, resins having one or more amino groups, resins having one or more phenolic hydroxyl groups, and anhydride resins, and said powder coating contains one or more resins selected from the group consisting of resins having one or more epoxy groups, resins having one or more glycidyl groups, and resins having one or more unsaturated bonds.

4. A powder coating composition comprising two or more powder coatings, wherein each of said powder coatings comprises a resin not having thermosetting properties at a temperature of 160° C. or less by itself, and being heat-cured at a temperature of 160° C. or less to form a coating film when used in combination with other powder coatings.

5. The powder coating composition according to claim 4, wherein said powder coating composition comprises a powder coating containing one or more resins selected from the group consisting of resins having one or more carboxyl groups, resins having one or more amino groups, resins having one or more phenolic hydroxyl groups, and anhydride resins; and other powder coatings containing one or more resins selected from the group consisting of resins having one or more epoxy groups, resins having one or more glycidyl groups, and resins having one or more unsaturated bonds.

6. A coating method comprising:

(a) mixing two or more powder coatings according to claim 1 to form a mixture;

(b) applying said mixture to a substrate; and (c) heating said mixture at a temperature of 160° C. or less to heat cure said powder coating mixture.

7. A coating method comprising:

(a) applying to a substrate the powder coating composition according to claim 4; and (b) heating said composition at a temperature of 160° C. or less to heat cure said powder coating composition.

* * * * *